(12) United States Patent
Pattok

(10) Patent No.: US 6,955,623 B2
(45) Date of Patent: Oct. 18, 2005

(54) SINGLE PLANET STEERING POSITION PLANETARY DIFFERENTIAL

(75) Inventor: Eric D. Pattok, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/178,869

(22) Filed: Jun. 24, 2002

(65) Prior Publication Data

US 2003/0236146 A1 Dec. 25, 2003

(51) Int. Cl.$^7$ .............................. F16H 3/72; F16H 3/70; F16H 48/06; F16H 1/30
(52) U.S. Cl. ........................... 475/3; 475/333; 475/229; 475/170
(58) Field of Search ................................ 475/163, 169, 475/170, 168, 172, 229, 333, 223, 226, 228, 4, 248; 74/650; 180/444

(56) References Cited

U.S. PATENT DOCUMENTS

| | | | | |
|---|---|---|---|---|
| 1,445,864 A | * | 2/1923 | Alden | 475/248 |
| 1,445,865 A | * | 2/1923 | Alden | 475/248 |
| 1,460,064 A | * | 6/1923 | Keck | 475/226 |
| 1,477,039 A | * | 12/1923 | Culver | 475/174 |
| 1,571,800 A | * | 2/1926 | Rockwell | 475/226 |
| 1,704,803 A | * | 3/1929 | Mlinko | 475/226 |
| 1,802,545 A | * | 4/1931 | Acker | 475/226 |
| 1,810,194 A | * | 6/1931 | Weaver | 475/226 |
| 1,811,059 A | * | 6/1931 | Morgan | 475/228 |
| 1,873,491 A | * | 8/1932 | Schumb et al. | 475/228 |
| 2,092,128 A | * | 9/1937 | Lawler | 475/174 |
| 2,170,733 A | * | 8/1939 | Sharpe | 475/174 |
| 2,416,495 A | * | 2/1947 | Piasse | 101/152 |
| 2,908,191 A | * | 10/1959 | Sundt | 475/176 |
| 2,948,165 A | * | 8/1960 | Luthi | 475/158 |
| 3,165,943 A | * | 1/1965 | Sundt | 74/498 |
| 3,420,113 A | * | 1/1969 | Tauscher | 74/63 |
| 3,511,104 A | * | 5/1970 | Piat | 74/388 R |
| 4,109,550 A | * | 8/1978 | Murayama | 475/217 |
| 4,497,220 A | * | 2/1985 | Grinde | 475/226 |
| 4,715,462 A | * | 12/1987 | Taig | 180/444 |
| 4,973,295 A | * | 11/1990 | Lee | 475/153 |
| 5,415,595 A | * | 5/1995 | Nelson | 475/7 |
| 5,749,786 A | | 5/1998 | Pattok | 464/106 |
| 6,179,083 B1 | * | 1/2001 | Yamauchi | 180/444 |
| 6,261,199 B1 | * | 7/2001 | Schlangen | 475/163 |
| 6,424,896 B1 | | 7/2002 | Lin et al. | |
| 6,443,020 B1 | | 9/2002 | Lin et al. | |
| 6,719,658 B2 | * | 4/2004 | Haga et al. | 475/163 |

FOREIGN PATENT DOCUMENTS

JP          2000120810 A  *  4/2000  ............. F16H/1/32

OTHER PUBLICATIONS

U.S. Appl. No. 10/164,207, Menjak et al., filed Jun. 6, 2002.

* cited by examiner

*Primary Examiner*—Tisha Lewis
(74) *Attorney, Agent, or Firm*—Michael D. Smith

(57) ABSTRACT

A single planet planetary differential including a shaft mechanism, a planet gear, disposed so as to be meshingly communicated with the shaft mechanism, a carrier device, the carrier device defining a carrier cavity for rotatingly containing the planet gear, a worm gear, wherein the worm gear is disposed so as to be meshingly communicated with the carrier device and a differential housing, wherein the differential housing defines a differential cavity for rotatingly containing the shaft mechanism and the carrier device and wherein the differential housing defines a worm gear cavity for rotatingly containing the worm gear.

23 Claims, 3 Drawing Sheets

SINGLE PLANET STEERING POSITION PLANETARY DIFFERENTIAL

BACKGROUND

In most conventional vehicular steering systems, an input device (e.g. steering wheel or hand-wheel) is connected to a steering actuator (e.g. steerable road wheel) via an articulated mechanical linkage. As such, any motion of the input device is translated to the steering actuator resulting in a motion of the steering actuator that directly corresponds to the motion of the input device.

However, with vehicular steering systems that employ active steering, such as in an automotive front-controlled steering system, a given motion of the hand-wheel may be supplemented by the motion of a differential steering device or actuator in a manner responsive to the yaw and/or lateral acceleration of the vehicle, resulting in a motion of the steerable road wheels that does not necessarily directly correspond to the motion of the hand-wheel. For example, at very low speeds as might be experienced in a parking situation, a relatively small rotation of the hand-wheel may be supplemented via active steering to provide an increased steering angle to the steerable road wheels.

Although several prototypes of differential steering devices have been developed, these are primarily planetary gear differentials having multiple planet planetary gears. These multiple planet planetary gears, which work on the difference principle of changing sense by reversing the direction of the rotation of input to output when the carrier is held fixed, have a number of shortcomings. First, multiple gear meshes are used to accommodate the differential function while maintaining sufficient torque capacity. Multiple planets have multiple paths of gear mesh and dimensional and positional variation of these paths may cause synchronization issues. As such, excess backlash (unproductive rotation) is introduced into these multiple planet designs in order to avoid tooth mesh interference in any one of the gear mesh paths. This is undesirable because backlash and friction are detrimental to steering feel and requires that the phasing of the gear teeth be tightly controlled, increasing the manufacturing and production costs.

Second, several parts are required to accommodate the differential function. This also increases system cost and containment space. Third, external sun gears meshing with external planet gears produce a low contact ratio and thus produces wear on the system. Lastly, the sense of the differential gears have to be corrected by additional means, such as adding an additional gear train to correct the direction. This increases system cost and containment space. This extra gear train also has the added disadvantage in that the center axis is not maintained through the device and thus the input to output ratio is at least 3:1. The problem with this large ratio is that road feedback is decreased which may adversely affect driver feel.

BRIEF SUMMARY

A single planet planetary differential comprising: a shaft mechanism; a planet gear, disposed so as to be meshingly communicated with the shaft mechanism; a carrier device, the carrier device defining a carrier cavity for rotatingly containing the planet gear; a worm gear, the worm gear disposed so as to be meshingly communicated with the carrier device; and a differential housing, wherein the differential housing defines a differential cavity for rotatingly containing the shaft mechanism and the carrier device and wherein the differential housing defines a worm gear cavity for rotatingly containing the worm gear.

BRIEF DESCRIPTION OF THE DRAWINGS

Referring now to the drawings, wherein like elements are numbered alike in the several figures in which.

DETAILED DESCRIPTION OF AN EXEMPLARY EMBODIMENT

Figure 1:
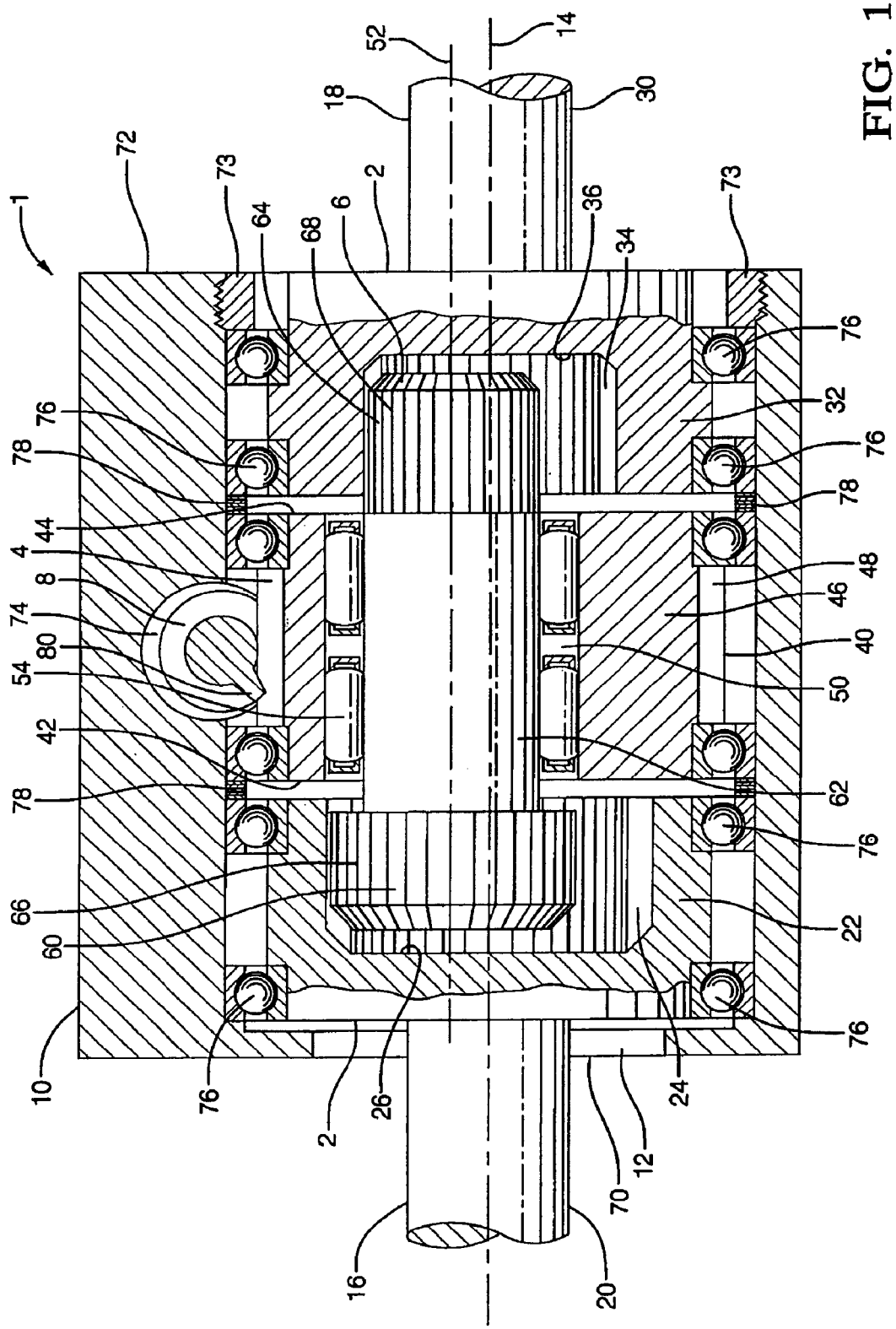
FIG. 1 shows a cross-sectional side view of single planet planetary differential in accordance with a first embodiment.

An exemplary embodiment is described herein by way of illustration as may be applied to a planetary differential and more particularly to a single planet planetary differential. While an exemplary embodiment is shown and described hereinbelow, it will be appreciated by those skilled in the art that the invention is not limited to the embodiment and application described herein, but also to any planetary differential. Those skilled in the art will appreciate that a variety of potential implementations and configurations are possible within the scope of the disclosed embodiments.

The single planet planetary differential embodiments discussed hereinbelow advantageously increases driver feel by providing an input to output ratio of about 1:1. These embodiments provide a Type H differential design having a high conforming planet to ring gear, single planet arrangement for steering applications. A single planet planetary gear differential is provided wherein the planet is very large and crosses over the central axis of the mechanism. This advantageously allows for high conformity between planet gear and ring gear pitch diameters which in turn allows for a high contact ratio and thus a very high loading capacity.

In addition, the embodiment described hereinbelow advantageously allow for less stringent phasing control of planet gear teeth orientation, which provides a large advantage over stepped planetary systems that have multiple planets because the angular orientation of all sets of planet gear teeth must be held very tight. Thus, for stepped planetary systems any process deviation in the orientation of the planet gear teeth must be compensated for by increasing allowable lash at one of the gear sets.

In addition, the single planet planetary differential embodiments discussed hereinbelow advantageously allows includes a simple de-lashing device and advantageously employs a one piece carrier device arrangement without the need for covers and/or pins to act as bearing journals, wherein the carrier device is a gear with an off center hole bored through it as described hereinbelow.

Moreover, carrier devices in current differential designs tend to be very large and requires a multiple piece differential housing design which put the bearing bores for the different components into different differential housings which increases lash and friction in the steering system. However, the single planet planetary differential embodiments discussed hereinbelow allow for all components to be assembled into a single bore in the differential housing. This advantageously allows for lash and friction in the steering system to be kept to a minimum by allowing the use of the same support bearings.

Furthermore, the single planet planetary differential embodiments discussed hereinbelow advantageously allows for the de-lashing of all support bearing with a single operation via a bearing adjustment device as described herein below. This capability advantageously removes undesired axial play or displacement of the support bearings. Lastly, the single planet planetary differential embodiments discussed hereinbelow advantageously utilize joint already existent in steering systems. The single planet planetary differential embodiments discussed hereinbelow also advantageously uses cycloidal teeth to get a very high contact ratio.

Referring to FIG. 1, a single planet planetary differential 1 in accordance with a first embodiment is illustrated and preferably includes a shaft mechanism 2, a carrier device 4, a planet gear 6, a worm gear 8 and a differential housing 10 defining a housing cavity 12 having a central axis 14. In addition, shaft mechanism 2 preferably includes an input shaft mechanism 16 and an output shaft mechanism 18. Although, differential housing 10 is preferably constructed from an aluminum material, differential housing 10 may be constructed from any material and/or material combination suitable to the desired end purpose.

Input shaft mechanism 16 preferably includes an input shaft 20 and a shaft input gear 22 having shaft input gear teeth 24. Input shaft 20 is preferably disposed relative to shaft input gear 22 so as to define an input cavity 26, wherein input cavity 26 is disposed so as to be communicated with shaft input gear teeth 24. In addition, input shaft 20 is preferably disposed so as to be non-movably associated with shaft input gear 22.

Output shaft mechanism 18 preferably includes an output shaft 30 and a shaft output gear 32 having shaft output gear teeth 34. Output shaft 30 is preferably disposed relative to shaft output gear 32 so as to define an output cavity 36, wherein output cavity 36 is disposed so as to be communicated with shaft output gear teeth 34. In addition, output shaft 30 is preferably disposed so as to be non-movably associated with shaft output gear 32. Although, input shaft 20 and/or output shaft 30 are preferably constructed from steel, input shaft 20 and/or output shaft 30 may be constructed from any material and/or material combination suitable to the desired end purpose.

Carrier device 4 preferably includes a carrier housing 40 having a carrier front 42, a carrier rear 44 and a carrier outer surface 46, wherein carrier outer surface 46 preferably includes carrier gear teeth 48 and wherein carrier housing 40 preferably defines a carrier cavity 50 having a carrier axis 52. Carrier cavity 50 is preferably disposed so as to communicate carrier front 42 with carrier rear 44. In addition, carrier device 4 preferably includes carrier bearings 54 disposed within carrier cavity 50.

Planet gear 6 preferably includes a planet front section 60, a planet mid-section 62 and a planet rear section 64, wherein planet mid-section 62 is disposed so as to separate planet front section 60 and planet rear section 64. In addition, planet front section 60, planet mid-section 62 and planet rear section 64 are preferably disposed so as to be non-movably associated with each other. Furthermore, planet front section 60 preferably includes planet input teeth 66 and planet rear section 64 preferably includes planet output teeth 68.

Differential housing 10 preferably further includes a housing front 70, a housing rear 72 and a bearing adjustment device 73, wherein differential housing 10 defines a worm cavity 74 for movably containing worm gear 8. Worm cavity 74 is preferably disposed so as to be communicated with housing cavity 12. Housing cavity 12 is preferably disposed so as to communicate housing front 70 with housing rear 72. In addition, differential housing preferably includes a support bearing 76 disposed within housing cavity 12. Although, carrier device 4 and/or worm gear 8 are preferably constructed from steel, carrier device 4 and/or worm gear 8 may be constructed from any material and/or material combination suitable to the desired end purpose. Bearing adjustment device 73 is adjustably disposed so as to allow de-lashing of the internal clearance of support bearings 76 and/or axial clearance between support bearings 76. Bearing adjustment device 73 is preferably a screw, however bearing adjustment device 73 may be a retainer (such as a snap ring, screw nut, etc) and/or an elastic member (such as a steel spring, rubber element, etc.). Moreover, bearing adjustment device 73 may be any de-lashing device and/or method suitable to the desired end purpose.

In accordance with a first embodiment, input shaft mechanism 16 is preferably disposed within housing cavity 12 so as to be centered about central axis 14. Input shaft mechanism 16 is also preferably disposed such that shaft input gear 22 is contained within housing cavity 12 and input shaft 20 is communicated with housing front 70. In addition, input shaft mechanism 16 is preferably disposed so as to be supportingly and rotatingly associated with support bearing 76. Carrier 4 is preferably disposed within housing cavity 12 so as to be adjacent to input shaft mechanism 16 such that carrier cavity 50 is communicated with input cavity 26. In addition, carrier 4 is preferably disposed within housing cavity 12 such that carrier gear teeth 48 are communicated with worm cavity 74. Worm gear 8 preferably includes worm thread 80 and is preferably disposed within worm cavity 74 such that worm thread 80 is meshingly associated with carrier gear teeth 48. In addition, worm gear 8 is preferably communicated with and driven by an external device which is controlled by electronic algorithms stored within an engine control module. However, worm gear 8 may be controlled via any method and/or device suitable to the desired end purpose, such as an electric motor. Moreover, carrier 4 is preferably disposed within housing cavity 12 such that carrier axis 52 and central axis 14 are parallel with each other.

Planet gear 6 is preferably disposed with housing cavity 12 such that planet mid-section 62 is disposed within carrier cavity 50 and is supportingly and rotatingly associated with carrier bearings 54. Planet front section 60 is preferably disposed within input cavity 26 such that planet input teeth 66 are meshingly associated with input gear teeth 24. Planet gear 6 is preferably disposed such that planet rear section 64 is preferably disposed so as to be protruding from carrier cavity 50. Output shaft mechanism 18 is preferably disposed within housing cavity 12 so as to be centered around central axis 14. Output shaft mechanism 18 is also preferably disposed such that output shaft 30 is communicated with housing rear 72 and shaft output gear 32 is contained within housing cavity 12. Planet rear section 64 is preferably disposed within output cavity 36 wherein output shaft gear teeth 34 are meshingly associated with planet output teeth 68.

In accordance with a first embodiment, input shaft mechanism 16, output shaft mechanism 18 and carrier 4 are preferably disposed within housing cavity 12 so as to be supportingly and rotatingly associated with support bearing 76. Also, carrier 4 is preferably separated from input shaft mechanism 16 and output shaft mechanism 18 by spacers 78.

Referring to FIG. 1, single planet planetary differential 1 operates as described hereinbelow in accordance with a first embodiment. The input shaft mechanism 16 is controlled by the driver's hand-wheel. As the driver's hand-wheel is rotated the input shaft 20 and shaft input gear 22 rotate on support bearings 76 about central axis 14. Shaft input gear teeth 24 mesh or interact with planet input teeth 66 of planet front section 60 causing planet gear 6 to rotate on carrier bearings 54 about carrier axis 52. As planet gear 6 rotates, planet output teeth 68 mesh or interact with output shaft gear teeth 34 causing output shaft mechanism 18 to rotate about central axis 14. When worm gear 8 is rotated in response to the electronic algorithms, worm thread 80 mesh or interact with carrier gear teeth 48 so as to cause carrier device 4, and hence planet gear 6, to rotate about central axis 14. This causes planet gear 6 to rotate about carrier axis 52 and about central axis 14, simultaneously.

In order to provide a better understanding of the operational characteristics of a single planet planetary differential during vehicle operation, four common operational scenarios using a single planet planetary differential is discussed hereinbelow.

The first scenario addresses road feedback for a vehicle operator. Road feedback is a function of the input to output ratio (e.g. the ratio between the input shaft mechanism 16 to the output shaft mechanism 18) when carrier device 4 is fixed in position. As such, the closer the input to output ratio is to a 1:1 ratio, the better the road feedback.

Under this scenario, input shaft mechanism 16 is controlled by a driver's hand wheel. As the hand wheel rotates, this rotational motion is translated to input shaft mechanism 16 which also rotates. This in turn causes shaft input gear teeth 24 to rotatingly mesh with planet input teeth 66 which induces planet gear 6 to rotate about its own axis, which may be the same as carrier axis 52. As planet gear 6 rotates, planet output teeth 68 rotatingly meshes with shaft output gear teeth 34, which induces output shaft mechanism 18 to rotate about central axis 14. In this situation, carrier device 4 is held in place by worm gear 8 so as prevent carrier device 4 from rotating about its own axis, which may be the same as central axis 14. This means that the axis of the bore in carrier device 4 is also stationary and thus is prevented from rotating about central axis 14. As a result, the overall input to output ratio is directly associated with the gear ratio between shaft input gear teeth 24 and planet input teeth 66 and/or planet output teeth 68 and shaft output gear teeth 34 and is advantageously about 1:1.

The second scenario addresses correction action taken by a controller without driver input. This corrective action may be a function of the ratio between carrier device 4 and output shaft mechanism 18 while input shaft mechanism 16 is fixed in position. Under this scenario, input shaft mechanism 16, which is controlled by a driver's hand wheel, is held fixed. Carrier device 4 is rotated via worm gear 8, which is controlled by algorithms disposed within a controller, such as an engine control module. As carrier device 4 rotates about central axis 14, central axis 14 rotates about carrier axis 52. The orbiting of central axis 14 about carrier axis 52 while planet input teeth 66 meshingly interact with shaft input gear teeth 24 causes planet gear 6 to rotate about its own axis, which may be the same as carrier axis 52. This combination of the orbiting and rotation of planet gear 6 while planet output teeth 68 meshingly interact with shaft output gear teeth 34 induce output shaft mechanism 18 to rotate about central axis 14.

The third scenario addresses the self-corrective alignment of the hand wheel center position to the road wheel center position. This self-alignment is a function of the ratio of carrier device 4 to input shaft mechanism 16 when the output shaft mechanism 18 is fixed. Under this scenario, the input shaft mechanism 16 is assumed to be free of driver torque at the time of self-correction. In addition, a method of centering the vehicle pinion is also assumed to exist. Carrier device 4 is rotated via worm gear 8, which is controlled by algorithms disposed within a controller, such as an engine control module. The rotation of carrier device 4 about central axis 14 causes carrier axis 52 to orbit about central axis 14. The orbiting of carrier axis 52 about central axis 14 while planet output teeth 68 rotatingly mesh with shaft output gear teeth 34 causes planet gear 6 to rotate about is own axis, which may be the same as carrier axis 52. The combination of the orbiting and rotation of planet gear 6 while planet input teeth 66 rotatingly mesh with shaft input gear teeth 24 induces input shaft mechanism 16 to rotate about central axis 14 until input shaft mechanism 16 and the associated hand wheel are centered.

The fourth scenario addresses the variable ration between the driver and the pinion. This self-alignment is a function of the ratio input shaft mechanism 16 to output shaft mechanism 18 when nothing is held fixed and is thus a differential mode situation. Under this scenario, input shaft mechanism 16 is controlled via a driver's hand wheel. Carrier device 4 is rotated via worm gear 8, which is controlled by algorithms disposed within a controller, such as an engine control module. The rotation of carrier device 4 about central axis 14 causes carrier axis 52 to orbit about central axis 14. The orbiting of carrier axis 52 about central axis 14 while planet output teeth 68 rotatingly mesh with shaft output gear teeth 34 of fixed output shaft mechanism 18 causes planet gear 6 to rotate about its own axis, which may be the same as carrier axis 52. The combination of the hand wheel motion through input shaft mechanism 16 and the controlled input via carrier device 4 induces a rotation and orbiting of planet gear 6 about central axis 14. The combination of the orbiting and rotation of planet gear 6 while planet input teeth 66 rotatingly mesh with shaft input gear teeth 24 induces input shaft mechanism 16 to rotate about central axis 14.

Figure 2:
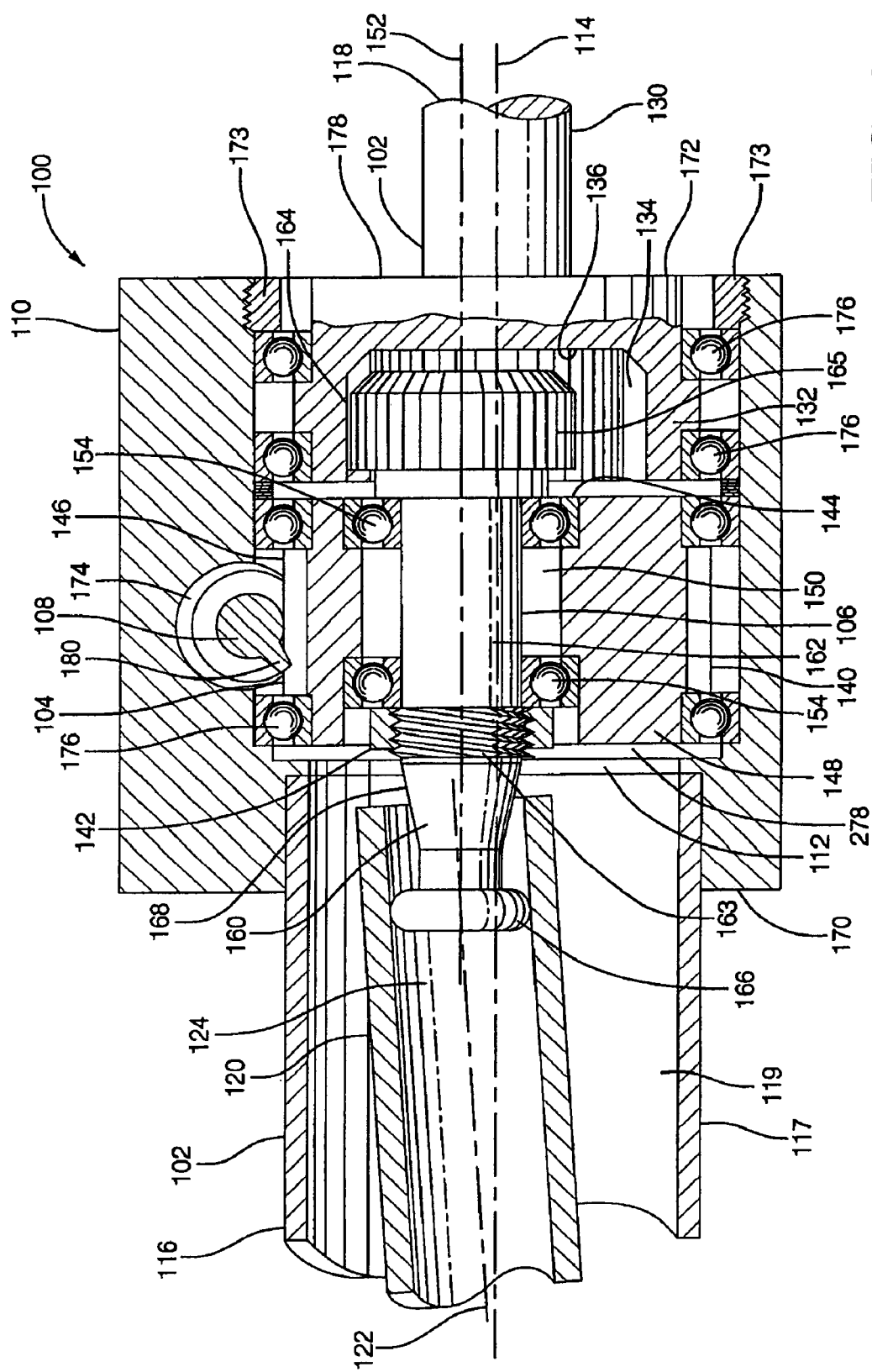
FIG. 2 shows a cross-sectional side view of single planet planetary differential in accordance with a second embodiment.

Referring to FIG. 2, a single planet planetary differential 100 in accordance with a second embodiment is illustrated and preferably includes a shaft mechanism 102, a carrier device 104, a planet gear 106, a worm gear 108 and a differential housing 110 defining a housing cavity 112 having a central axis 114. In addition, shaft mechanism 102 preferably includes an input shaft mechanism 116 and an output shaft mechanism 118.

Input shaft mechanism 116 preferably includes a shaft outer structure 117 defining a shaft cavity 119 and an input shaft 120 having an input shaft axis 122, wherein input shaft 120 defines an input cavity 124 having an input cavity diameter 126.

Output shaft mechanism 118 preferably includes an output shaft 130 and a shaft output gear 132 having shaft output gear teeth 134. Output shaft 130 is preferably disposed relative to shaft output gear 132 so as to define an output cavity 136, wherein output cavity 136 is disposed so as to be communicated with shaft output gear teeth 134. In addition, output shaft 130 is preferably disposed so as to be non-movably associated with shaft output gear 132.

Carrier device 104 preferably includes a carrier housing 140 having a carrier front 142, a carrier rear 144 and a carrier outer surface 146, wherein carrier outer surface 146 preferably includes carrier gear teeth 148 and wherein carrier housing 140 preferably defines a carrier cavity 150 having a carrier axis 152. Carrier cavity 150 is preferably disposed so as to communicate carrier front 142 with carrier rear 144. In addition, carrier device 104 preferably includes carrier bearings 154 disposed within carrier cavity 150.

Planet gear 106 preferably includes a planet front section 160, a planet mid-section 162 and a planet rear section 164, wherein planet mid-section 162 is disposed so as to separate planet front section 160 and planet rear section 164. Planet mid-section 162 also includes planet threads 163 as a bearing de-lash mechanism. In addition, planet front section 160, planet mid-section 162 and planet rear section 164 are preferably disposed so as to be non-movably associated with each other. Furthermore, planet rear section 164 preferably includes planet output teeth 165 and planet front section 160 preferably includes a front planet joint 166, wherein front planet joint 166 is communicated with planet mid-section 162 via a beveled portion 168.

Differential housing 110 preferably further includes a housing front 170, a housing rear 172, a bearing adjustment device 173 and defines a worm cavity 174 for movably containing worm gear 108. Worm cavity 174 is preferably disposed so as to be communicated with housing cavity 112. Housing cavity 112 is preferably disposed so as to communicate housing front 170 with housing rear 172. In addition, differential housing preferably includes a support bearing 176 disposed within housing cavity 112. Bearing adjustment device 173 is adjustably disposed so as to allow de-lashing of the internal clearance of support bearings 176 and/or axial clearance between support bearings 176. Bearing adjustment device 173 is preferably a screw, however bearing adjustment device 173 may be a retainer (such as a snap ring, screw nut, etc) and/or an elastic member (such as a steel spring, rubber element, etc.). Moreover, bearing adjustment device 173 may be any de-lashing device and/or method suitable to the desired end purpose.

In accordance with a second embodiment, input shaft mechanism 116 is preferably disposed so as to be communicated with housing front 170 such that shaft outer structure 117 is non-movably communicated with housing cavity 112. In addition, shaft outer structure 117 is disposed so as to be centered around central axis 114. Input shaft 120 is preferably disposed within shaft cavity 119 so as to be movably associated with shaft outer structure 117.

Carrier 104 is preferably disposed within housing cavity 112 so as to be adjacent to input shaft mechanism 116 such that carrier cavity 150 is communicated with shaft cavity 119. In addition, carrier 104 is preferably disposed within housing cavity 112 such that carrier gear teeth 148 are communicated with worm cavity 174. Worm gear 108 preferably includes worm gear teeth 180 and is preferably disposed within worm cavity 174 such that worm gear teeth 180 are movingly associated with carrier gear teeth 148. Moreover, carrier 104 is preferably disposed within housing cavity 112 such that carrier axis 152 and central axis 114 are parallel with each other.

Planet gear 106 is preferably disposed within housing cavity 112 such that planet mid-section 162 is disposed within carrier cavity 150 and is supportingly and rotatingly associated with carrier bearings 154. Planet front section 160 is preferably disposed so as to be protruding into shaft cavity 119 wherein front planet joint 166 is movably contained within input cavity 124. Planet front section 160 is preferably pivotally associated with input shaft 120 so as to allow input shaft axis 122 to change relative to carrier axis 152. In addition, planet gear 106 is preferably disposed such that planet rear section 164 is protruding from carrier cavity 150. Output shaft mechanism 118 is preferably disposed within housing cavity 112 so as to be centered around central axis 114. Output shaft mechanism 118 is also preferably disposed such that output shaft 130 is communicated with housing rear 172 and shaft output gear 132 is contained within housing cavity 112. Planet rear section 164 is preferably disposed within output cavity 136 wherein output shaft gear teeth 134 are meshingly associated with planet output teeth 165.

In accordance with a second embodiment, output shaft mechanism 118 and carrier 104 are preferably disposed within housing cavity 112 so as to be supportingly and rotatingly associated with support bearing 176. Also in accordance with a second embodiment, carrier 104 is preferably separated from output shaft mechanism 118 by spacers 178.

In accordance with a second embodiment, input shaft 120 includes a universal joint at both ends and is preferably the same as disclosed in U.S. Pat. No. 5,749,786A1 entitled Shaft Coupling in Motor Vehicle Steering Shaft to Eric David Pattock. However, input shaft 120 may be any input shaft suitable to the desired end purpose.

Figure 3:
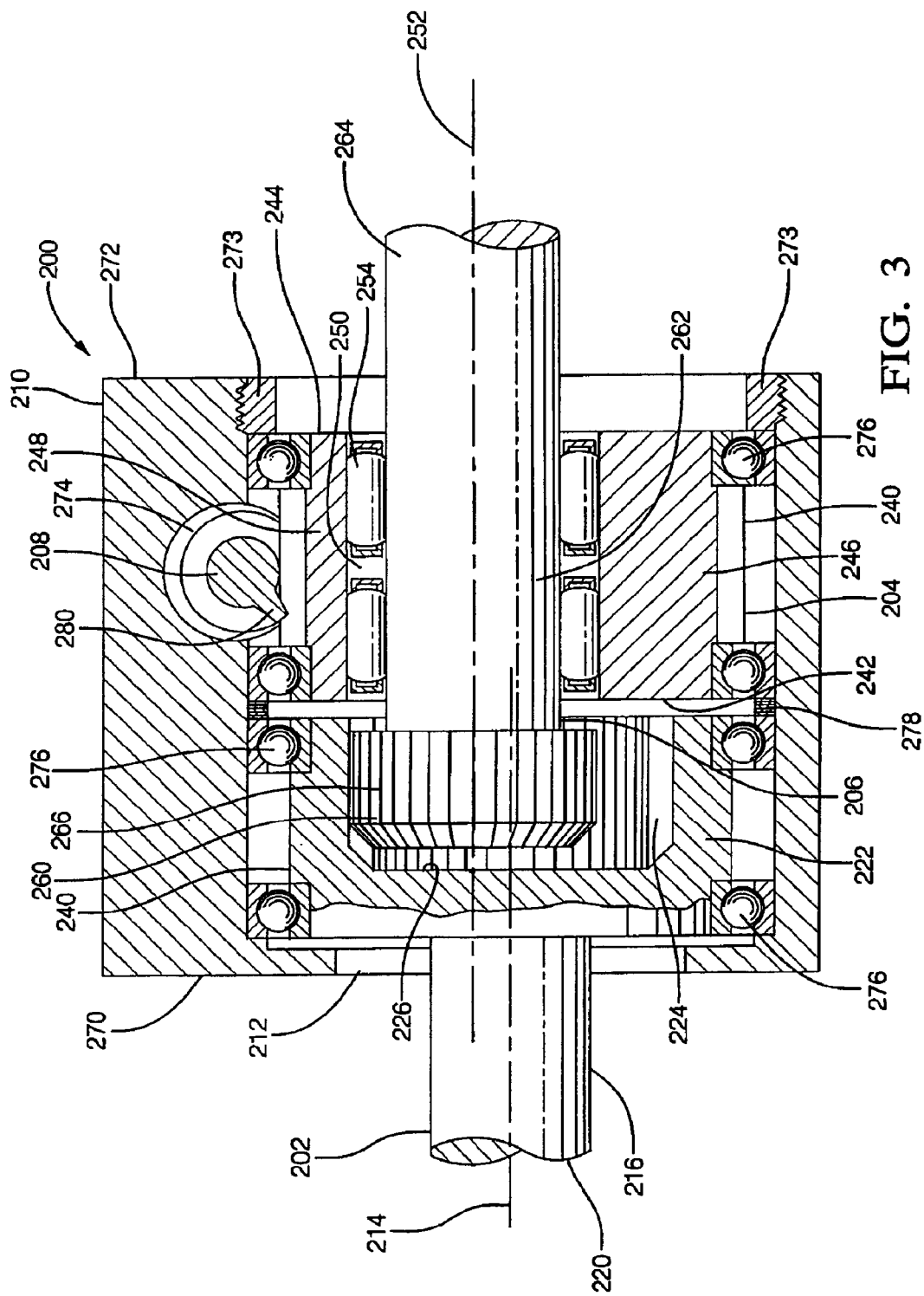
FIG. 3 shows a cross-sectional side view of single planet planetary differential in accordance with a third embodiment.

Referring to FIG. 3, a single planet planetary differential 200 in accordance with a third embodiment is illustrated and preferably includes a shaft mechanism 202, a carrier device 204, a planet gear 206, a worm gear 208 and a differential housing 210 defining a housing cavity 212 having a central axis 214. In addition, shaft mechanism 202 preferably includes an input shaft mechanism 216.

Input shaft mechanism 216 preferably includes an input shaft 220 and a shaft input gear 222 having shaft input gear teeth 224. Input shaft 220 is preferably disposed relative to shaft input gear 222 so as to define an input cavity 226, wherein input cavity 226 is disposed so as to be communicated with shaft input gear teeth 224. In addition, input shaft 220 is preferably disposed so as to be non-movably associated with shaft input gear 222.

Carrier device 204 preferably includes a carrier housing 240 having a carrier front 242, a carrier rear 244 and a carrier outer surface 246, wherein carrier outer surface 246 preferably includes carrier gear teeth 248 and wherein carrier housing 240 preferably defines a carrier cavity 250 having a carrier axis 252. Carrier cavity 250 is preferably disposed so as to communicate carrier front 242 with carrier rear 244. In addition, carrier device 204 preferably includes carrier bearings 254 disposed within carrier cavity 250.

Planet gear 206 preferably includes a planet front section 260, a planet mid-section 262 and a planet rear section 264, wherein planet mid-section 262 is disposed so as to separate planet front section 260 and planet rear section 264. In addition, planet front section 260, planet mid-section 262 and planet rear section 264 are preferably disposed so as to be non-movably associated with each other. Furthermore, planet front section 260 preferably includes planet input teeth 266.

Differential housing 210 preferably further includes a housing front 270, a housing rear 272, a bearing adjustment device 273 and defines a worm cavity 274 for movably containing worm gear 208. Worm cavity 274 is preferably disposed so as to be communicated with housing cavity 212. Housing cavity 212 is preferably disposed so as to communicate housing front 270 with housing rear 272. In addition, differential housing preferably includes a support bearing 276 disposed within housing cavity 212. Bearing adjustment device 273 is adjustably disposed so as to allow de-lashing of the internal clearance of support bearings 276 and/or axial clearance between support bearings 276. Bearing adjustment device 273 is preferably a screw, however bearing adjustment device 273 may be a retainer (such as a snap ring, screw nut, etc) and/or an elastic member (such as a steel spring, rubber element, etc.). Moreover, bearing adjustment device 273 may be any de-lashing device and/or method suitable to the desired end purpose.

In accordance with a third embodiment, input shaft mechanism 216 is preferably disposed within housing cavity 212 so as to be centered around central axis 214. Input shaft mechanism 216 is also preferably disposed such that shaft input gear 222 is contained within housing cavity 212 and input shaft 220 is communicated with housing front 270. In addition, input shaft mechanism 216 is preferably disposed so as to be supportingly and rotatingly associated with support bearing 276. Carrier 204 is preferably disposed within housing cavity 212 so as to be adjacent to input shaft mechanism 216 such that carrier cavity 250 is communicated with input cavity 226. In addition, carrier 204 is preferably disposed within housing cavity 212 such that carrier gear teeth 248 are communicated with worm cavity 274. Worm gear 208 preferably includes worm gear teeth 280 and is preferably disposed within worm cavity 274 such that worm gear teeth 280 are meshingly associated with carrier gear teeth 248. Moreover, carrier 204 is preferably disposed within housing cavity 212 such that carrier axis 252 and central axis 214 are parallel with each other.

Planet gear 206 is preferably disposed with housing cavity 212 such that planet mid-section 262 is disposed within carrier cavity 250 and is supportingly and rotatingly associated with carrier bearings 254. Planet front section 260 is preferably disposed within input cavity 226 such that planet input teeth 266 are meshingly associated with input gear teeth 224. Planet gear 206 is preferably disposed such that planet rear section 264 is protruding from carrier cavity 250.

In accordance with a third embodiment, input shaft mechanism 216 and carrier 204 are preferably disposed within housing cavity 212 so as to be supportingly and rotatingly associated with support bearing 276. Also in accordance with a third embodiment, carrier 204 is preferably separated from input shaft mechanism 216 by spacers 278.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A single planet planetary differential comprising:
   an input shaft mechanism;
   a single planet pinion, disposed so as to be meshingly communicated with said shaft mechanism;
   a carrier device, said carrier device defining a carrier cavity for rotatingly containing said single planet pinion;
   a worm gear, said worm gear disposed so as to be meshingly communicated with said carrier device;
   a differential housing, wherein said differential housing defines a differential cavity for rotatingly containing said shaft mechanism and said carrier device and wherein said differential housing defines a worm gear cavity for rotatingly containing said worm gear; and
   an output shaft mechanism in operable communication with the foregoing elements and which rotates in the same direction as said input shaft mechanism.

2. The single planet planetary differential according to claim 1, wherein said single planet pinion includes planet input teeth and wherein said input shaft has a shaft input gear having shaft input gear teeth, wherein said shaft input gear teeth are disposed so as to be meshingly associated with said planet input teeth.

3. The single planet planetary differential according to claim 1, wherein said single planet pinion includes planet output teeth and wherein said output shaft has a shaft output gear having shaft output gear teeth, wherein said shaft output gear teeth are disposed so as to be meshingly associated with said planet output teeth.

4. The single planet planetary differential according to claim 1, wherein said carrier device includes a carrier housing having a carrier outer surface wherein said carrier outer surface includes carrier gear teeth.

5. This single planet planetary differential according to claim 4, wherein said worm gear includes worm thread and wherein said worm gear is disposed such that said worm thread is meshingly communicated with said carrier gear teeth.

6. The single planet planetary differential according to claim 1, wherein said carrier cavity includes a carrier axis and wherein said differential housing includes a differential axis, wherein said carrier device is disposed relative to said differential housing such that said carrier axis and said differential axis are parallel.

7. The single planet planetary differential according to claim 1, wherein said single planet pinion includes a planet front section and a planet rear section, wherein said planet front section is non-movably disposed relative to said planet rear section.

8. The single planet planetary differential according to claim 1, wherein said differential housing includes a support bearing disposed so as to be supportingly and rotatingly associated with one of said input shaft mechanism, output shaft mechanism and said carrier device.

9. The single planet planetary differential according to claim 1, wherein said carrier device includes a carrier bearing disposed so as to be supportingly and rotatingly associated with said single planet pinion.

10. The single planet planetary differential according to claim 1, further comprising a bearing adjustment device and a plurality of support bearings, wherein said bearing adjustment device is disposed so as to allow positional adjustment of said plurality of support bearings.

11. The single planet planetary differential according to claim 1, wherein said single planet pinion includes a planet roar section rotatingly disposed so as to protrude from said differential housing.

12. The single planet planetary differential according to claim 1, wherein said input shaft mechanism having a shaft outer structure and an input shaft, wherein said shaft outer structure defines a shaft cavity and wherein said input shalt defines an input cavity.

13. The single planet planetary differential according to claim 12, wherein said shaft outer structure is non-movably associated with said differential housing.

14. The single planet planetary differential according to claim 12, wherein said input shall is movably disposed within said shaft cavity.

15. The single planet planetary differential according to claim 12, wherein said single planet pinion includes a planet front section having a front planet joint, wherein said front planet joint is disposed within said input cavity so as to be pivotally associated within said input shaft.

16. The single planet planetary differential according to claim 1, wherein said input shaft mechanism, and said output shaft mechanism, includes an input to output ratio, wherein said shaft mechanism input to output ratio is about 1:1.

17. The single planet planetary differential according to claim 1, further including, a planet rear section and an input to output ratio, wherein said input to output ratio is about 1:1.

18. An eccentric single planet pinion planetary differential comprising:
- an input;
- an output;
- a single planet pinion eccentrically disposed about said input and said output, said single planet pinion having a planet input section located on said single planet pinion, a planet output section also located on said single planet pinion; and wherein said planet input section is non-movable relative to said planet output section.

19. The eccentric single planet pinion planetary differential according to claim 18, wherein the single planet pinion is orbitally moveable about the input.

20. The eccentric single planet pinion planetary differential according to claim 18, wherein the single planet pinion is orbitally moveable about the output.

21. The eccentric single planet pinion planetary differential according to claim 18, further comprising:
- planet output teeth located on said single planet pinion;
- a shaft output gear located on said output;
- output gear teeth located on said shaft output gear; and
- wherein said shaft output gear teeth are meshingly associated with said planet output teeth.

22. An eccentric single planet pinion planetary differential comprising:
- an input;
- an output;
- a single planet pinion eccentrically disposed about the input and the output;
- a differential housing defining a differential cavity for rotatingly containing said single planet pinion;
- a planet output section located on said single planet pinion; and
- wherein said planet output section rotatingly protrudes from said differential housing.

23. The eccentric single planet pinion planetary differential according to claim 22 wherein said input, and said output, include an input to output ratio of about 1:1.

* * * * *